US005634737A

United States Patent [19]
Voss et al.

[11] Patent Number: 5,634,737
[45] Date of Patent: Jun. 3, 1997

[54] COUPLER FOR ATTACHING AN ARTICULATED ARM TO A LASER

[75] Inventors: Gary C. Voss; Kevin P. Connors, both of Sunnyvale, Calif.

[73] Assignee: Coherent, Inc., Santa Clara, Calif.

[21] Appl. No.: 415,554

[22] Filed: Apr. 3, 1995

[51] Int. Cl.$^6$ ...................................................... F16B 7/20
[52] U.S. Cl. .............................. 403/349; 403/348; 606/19
[58] Field of Search ............................... 385/76; 403/348, 403/349; 606/19

[56] References Cited

U.S. PATENT DOCUMENTS

| | | | |
|---|---|---|---|
| 2,833,158 | 5/1958 | Damon | 403/349 X |
| 4,361,353 | 11/1982 | Vinson | 403/348 X |
| 4,473,074 | 9/1984 | Vassiliadis | 606/19 |
| 5,433,550 | 7/1995 | Huber | 403/348 |
| 5,474,449 | 12/1995 | Loge et al. | 606/19 X |

Primary Examiner—Kenneth J. Dorner
Assistant Examiner—Andrea Chop
Attorney, Agent, or Firm—Limbach & Limbach L.L.P.

[57] ABSTRACT

A coupler for conveniently coupling an articulated arm to a laser housing whereby the laser beam need not be realigned down the articulated arm each time the arm is coupled to the laser housing. The coupler includes a kinematic plate attached to the laser housing, a sleeve rotationally attached to the plate forming a center bore, and a connector attached to an articulated arm. The connector has a cylindrical shaped projecting member that inserts into the bore of the sleeve. Races are formed on the outer surface of the cylindrical member. The sleeve has roller bearings protruding inside the bore to engage the races. Ball bearings are attached to the end of the cylindrical member to engage the kinematic plate. The races are shaped such that when the sleeve is rotated, the cylindrical member is forced toward the kinematic plate until the ball bearings are secured against the kinematic plate. The ball bearings contacting the kinematic plate ensure that the connector is reattached each time with the exact same orientation relative to the kinematic plate and the laser housing. Therefore, no realignment of the beam into the input end of the articulated arm is required after each reattachment.

21 Claims, 5 Drawing Sheets

5,634,737

COUPLER FOR ATTACHING AN ARTICULATED ARM TO A LASER

FIELD OF THE INVENTION

The present invention relates to laser systems, and in particular to a coupler for attaching an articulated arm delivery system to a laser.

BACKGROUND OF THE INVENTION

Currently, many medical laser systems use an articulated arm as a delivery system to guide a laser beam from the laser to a patient or target tissue. An articulated arm typically includes a plurality of straight segments that are connected end to end by rotatable joints. In each joint, there is a reflective optic that redirects the laser beam from one segment into the next segment. As the joints are rotated, the reflective optics maintain proper alignment of the laser beam through the respective segments. With a plurality of segments and joints, the user can manipulate the output beam in any desired direction and orientation. The articulated arm is connected to the laser housing, which houses the laser cavity that produces the laser beam.

To insure optimal performance, it is essential that the articulated arm is properly aligned to the beam exiting the laser housing and entering the input end of the articulated arm. The beam must be properly aligned to the first reflective optic in the articulated arm to ensure proper propagation of the beam through the different arm segments. This alignment is typically performed in the factory after the arm is bolted to the laser housing.

One problem with laser systems that use articulated arms is that it is very difficult to ship such a laser system with the articulated arm attached to the laser housing. The laser housing is bulky and heavy, while the articulated arm is long and fragile. It is difficult to package the laser housing and the articulated arm for transportation with the two attached to each other. Further, there is a risk of damaging the articulated arm and/or its connection with the laser housing during transportation of the laser system, even if packaged properly.

One solution is to remove the articulated arm from the laser housing anytime the laser system is to be transported. However, there are several disadvantages to disconnecting the arm from the laser housing. First, it is cumbersome to remove and later replace the bolts used to attach the arm to the laser housing every time laser system is moved. Secondly, constant removal and replacement of these bolts creates wear and tear on the system, which increases the likelihood that the bolts and/or nuts will be stripped, lost or damaged. Finally, once the arm is removed, the factory alignment of the beam into the arm is lost, and the laser must be realigned after the arm is reattached.

The typical user of medical lasers are doctors and nurses who have little experience in bolting laser components together, let alone aligning a laser beam through an articulated arm. Further, many laser systems that use articulated arms are used in a portable environment, where they are frequently transported from site to site between uses. Therefore, the arm must either be left attached to the laser housing and shipped very carefully, or removed and later attached and realigned after each shipment.

There is a need for an articulated arm that easily attaches and detaches from the laser housing.

There is also a need for an articulated arm that reattaches to the laser housing whereby no realignment of the laser beam into the articulated arm is necessary after each reattachment.

SUMMARY OF THE INVENTION

The present invention solves the aforementioned problems by providing a coupler for the articulated arm whereby the arm can be conveniently detached and reattached to the laser system without necessitating a realignment of the laser beam through the arm.

The present invention includes a kinematic plate that is attachable to the housing of a laser. A cylindrical sleeve that defines a center bore is rotatably attached to the kinematic plate. A connector having a cylindrical shaped projecting member is attachable to the articulated arm. The cylindrical shaped projecting member is insertable into the bore of the sleeve.

Races are formed in the outside cylindrical surface of the cylindrical shaped projecting member. Roller bearings protrude into the bore of the sleeve which engage the races upon insertion of the cylindrical shaped projecting member into the bore of the sleeve. The race is shaped to draw in and lock the cylindrical shaped projecting member into the bore of the sleeve when the sleeve is rotated.

Ball bearings on the end of the cylindrical shaped projecting member engage slots in the kinematic plate to ensure that the connector is reattached each time with the exact same orientation relative to the kinematic plate and the laser housing. Therefore, no realignment of the beam into the input end of the articulated arm is required after each reattachment.

DETAILED DESCRIPTION OF THE PREFERRED EMBODIMENTS

Figure 1:
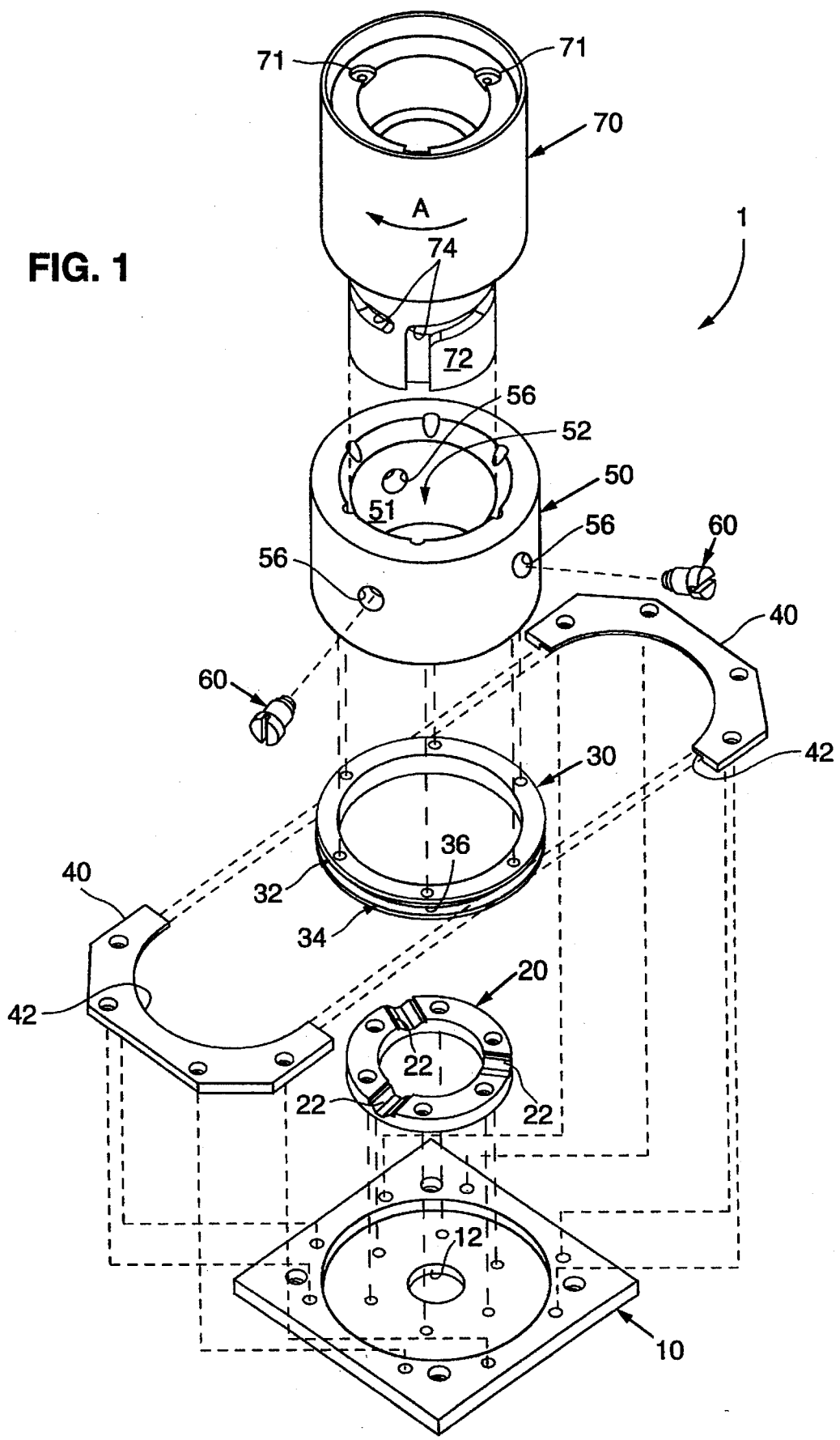
FIG. 1 an exploded view of the coupler of the present invention.
Figure 2:
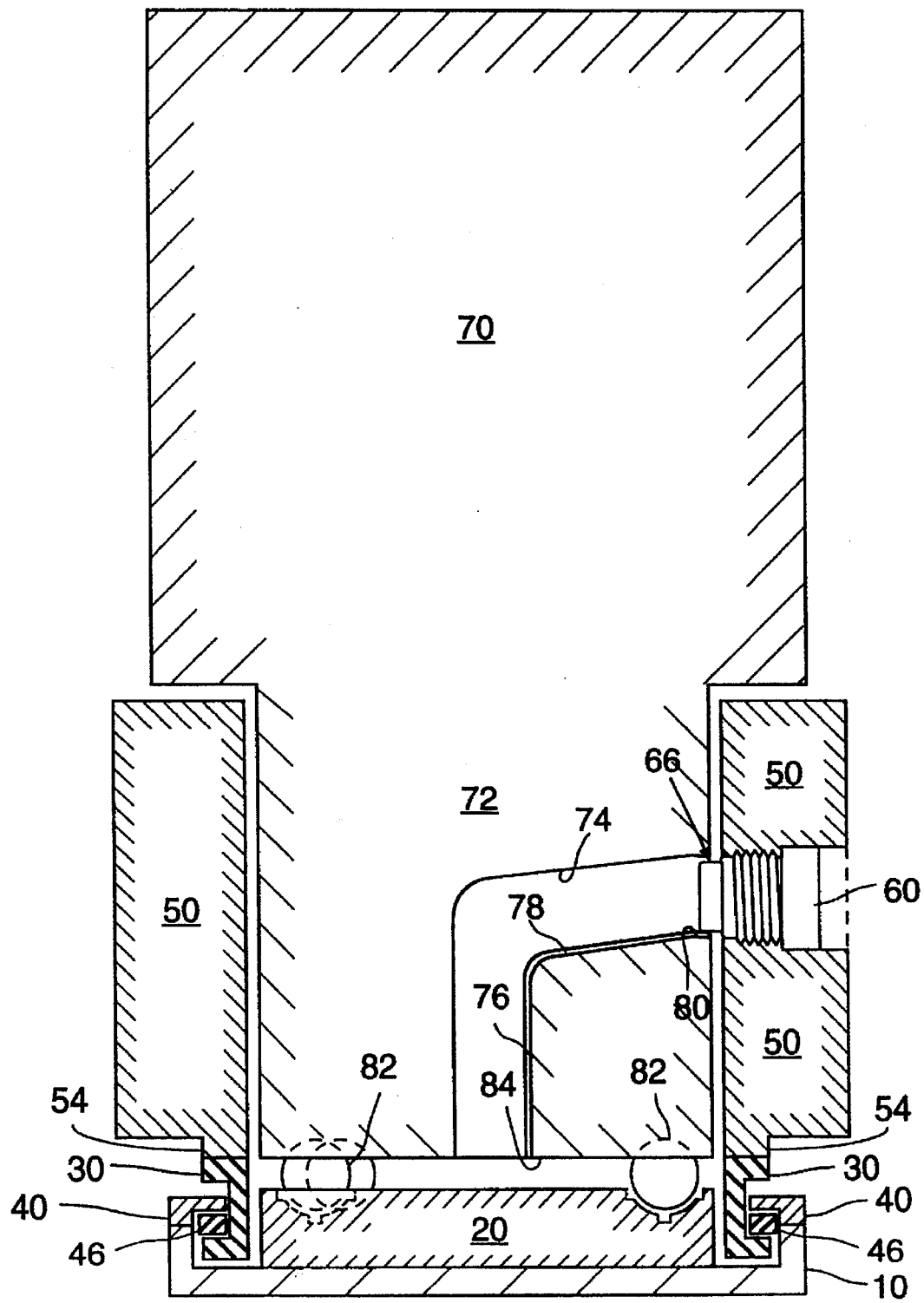
FIG. 2 is a side cross-sectional view illustrating the coupler of the present invention.

The preferred embodiment of the coupler of the present invention is illustrated in FIGS. 1 and 2. Coupler 1 includes a base plate 10, a kinematic plate 20, a sleeve ring 30, spring clamps 40, a sleeve 50, and a connector 70.

Base plate 10 mounts over the output aperture of the laser housing. Base plate 10 has a center hole through which the output laser beam passes.

The kinematic plate 20 mounts onto base plate 10. Kinematic plate 20 is in the form of a flat ring and has three ball bearing channels 22 evenly spaced on its top surface.

Sleeve ring 30 is formed by two annular flanges 32 and 34 connected together by a recessed ring portion 36.

Spring clamps 40 include a curved recessed portion 42 on their underneath side. Spring clamps mount to the base plate 10 such that the curved portions 42 engage the recessed ring portion 36 of sleeve ring 30 whereby the sleeve ring 30 is rotatably secured to base plate 10.

Figure 3:
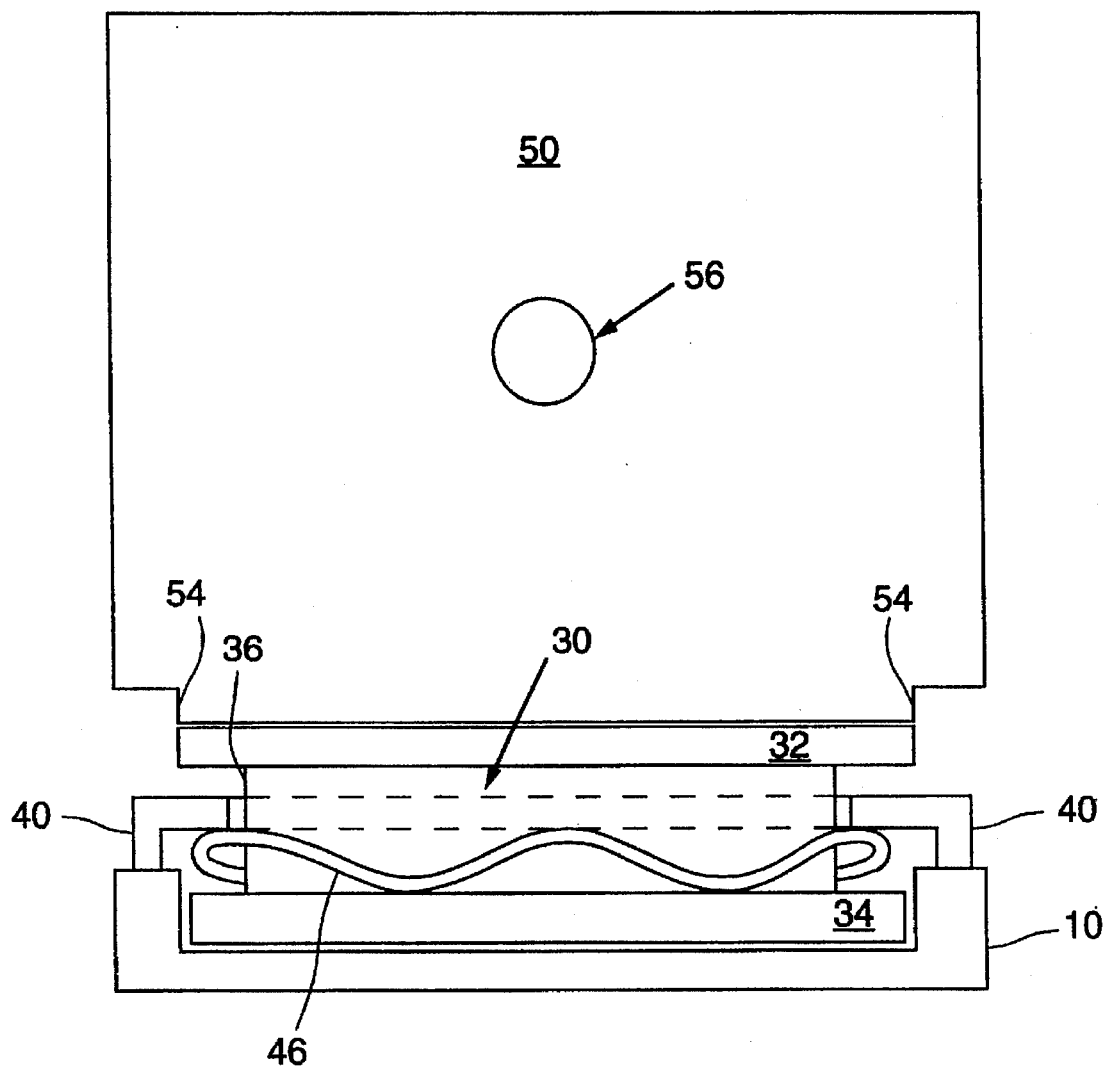
FIG. 3 is a side view of the sleeve, sleeve ring, spring plates and the wave spring.

Wave spring 46 is placed between the annular flange 34 of sleeve ring 30 and the spring clamps 40 (FIG. 3). Wave spring 46 exerts an upward force on spring clamp 40 and a downward force on sleeve ring 30. Depending upon the desired downward force, there may be a plurality of wave springs 46 stacked on top of each other between the annular flange 34 of sleeve ring 30 and the spring clamps 40.

Sleeve 50 has an inner surface 51 defining a bore 52, and a recessed base portion 54. Three threaded holes 56 pass through the sleeve 50 into bore 51. Annular flange 32 of sleeve ring 30 is mounted to the recessed base portion 54 of sleeve 50.

Figure 4:
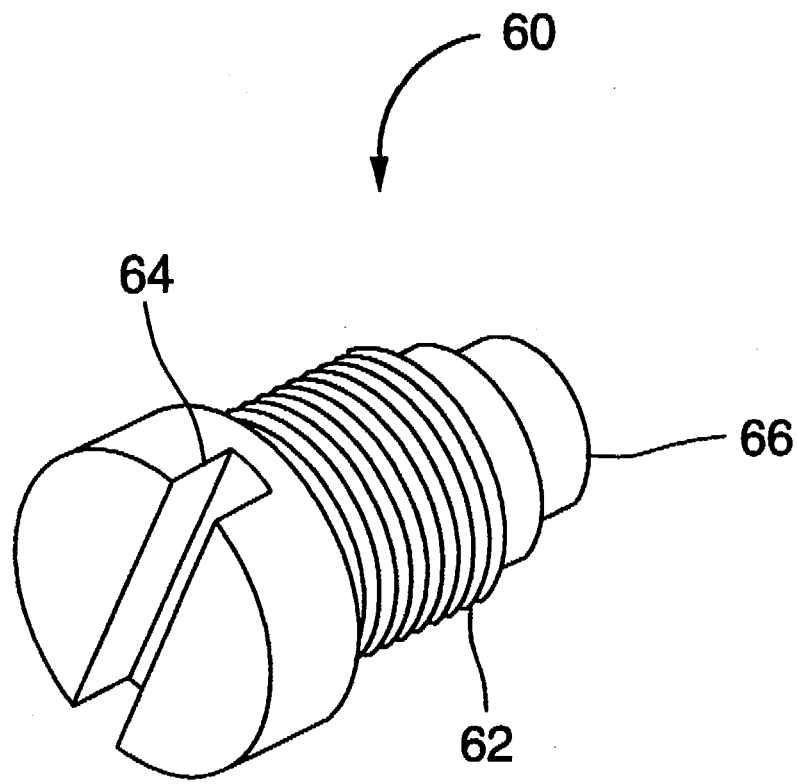
FIG. 4 is a perspective view of the roller bearing support.

Three bearing supports 60 are provided and include a threaded portion 62, a notch 64 on one end, and a roller bearing 66 on the other end (FIG. 4). The notch 64 is used to screw the bearing support 60 into the threaded hole 56 of sleeve 50 such that the roller bearing 66 protrudes into the bore 52 of sleeve 50. Roller bearing 66 can be formed integrally with bearing support 60, or it can be a ball bearing or cylinder bearing attached to the end of the bearing support 60.

Connector 70 includes, on one end, bolt holes 71 for mounting the connector 70 to the input end of an articulated arm. Alternately, the connector 70 can include other means for mounting to an articulated arm, or the connector 70 may be formed integrally as part of the input end of an articulated arm. The other end of connector 70 includes a cylindrical shaped projecting member 72.

Three races 74 are formed on the outer circumferential surface of cylindrical member 72 of connector 70. Races 74 are shaped to have a vertical portion 76 and an upwardly inclined portion 78 that terminates in a downward sloping portion 80.

Three ball bearings 82 are attached, or formed integrally, in the bottom surface 84 of the cylindrical member 72 in a complementary configuration to the configuration of the ball bearing channels 22 on kinematic plate 20.

To couple the connector 70 to the laser housing, the cylindrical member 72 of connector 70 is inserted into sleeve 50 such that roller bearings 66 protruding into the bore 51 of sleeve 50 engage with and travel along the vertical portion 76 of the races 74. Then, sleeve 50 is rotated counterclockwise (in the direction of arrow A in FIG. 1) to cause roller bearings 66 to travel up the upwardly inclined portion 78 of races 74. This engagement function places a downward force on the cylindrical member 72 so that ball bearings 82 on cylindrical member 72 seat in channels 22 of the kinematic plate 20. Further rotation of sleeve 50, with the roller bearings 66 still in the upwardly inclined portion 78 of races 74, drives sleeve 50 upwards which compresses spring 46. Still further rotation of sleeve 50 places the roller bearings 66 in the downward sloping portion 80 of races 74, which locks the rotational position of sleeve 50.

Ball bearings 82 seated in channels 22 of kinematic plate 20 ensure that the connector 70 has the same exact orientation relative to the laser housing each time the articulated arm is coupled to the laser. The spring tension from the compressed wave spring 46 maintains the proper position of ball bearings 82 in channels 22 of kinematic plate 20. Therefore, there is no need to realign the laser beam into the articulated arm each time the arm is coupled to the laser housing.

To decouple the connector 70, the sleeve 50 is rotated clockwise so that the roller bearings 66 travel out of the downward sloping portion 80, down the upwardly inclined portion 78, and out the vertical portion 76 of races 74.

Figure 5:
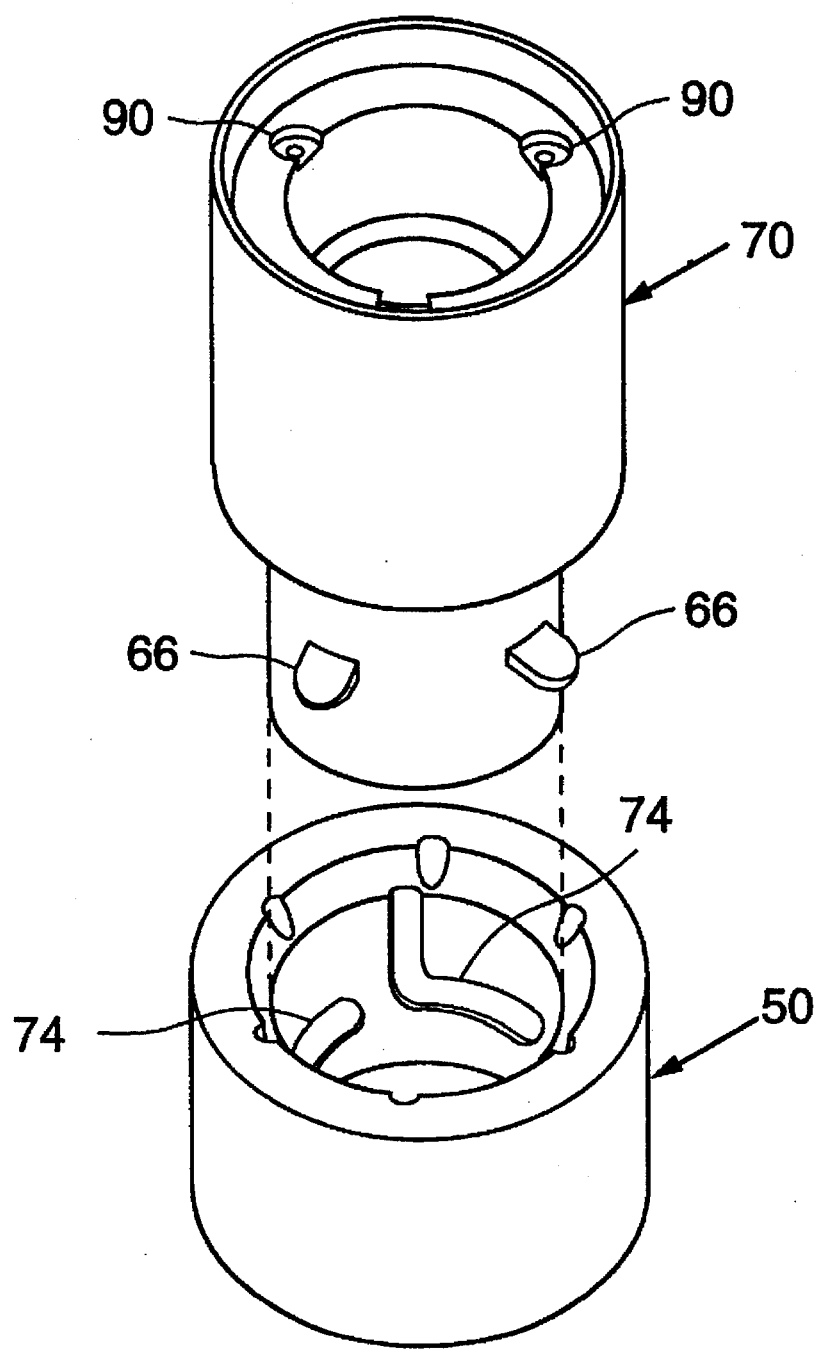
FIG. 5 is an exploded view of an alternate embodiment wherein the roller bearings are attached to the cylindrical shaped projecting member and the races are formed inside the sleeve.

An alternate embodiment of the present invention is illustrated in FIG. 5. The races 74 are formed on the inner sleeve surface 51 of sleeve 50, and the roller bearings 66 are formed or attached onto the cylindrical member 72 of connector 70.

It is to be understood that the present invention is not limited to the embodiments described above and illustrated herein, but encompasses any and all variations falling within the scope of the appended claims. For example, the number of roller bearings 66, races 74, etc., may differ. Further, attachable parts may also be formed integrally, such as the sleeve ring 30 and sleeve 50, or the bearing support 60 and the roller bearing 66, or the laser housing and the base plate 10 and the kinematic plate 20. Additionally, the direction of rotation to lock and unlock coupler 1 can be reversed. Lastly, the ball bearings 82 could be attached to the kinematic plate 20, and the ball bearing channels 22 could be formed on the bottom surface of the cylindrical member 72.

We claim:

1. A coupler for attaching an articulated arm to a laser housing comprising:

a connector having a cylindrical shaped projecting member with a mating surface formed on the end thereof, said connector being attachable to an articulated arm;

a kinematic plate connectable to a laser housing; and means for drawing together and locking said mating surface of said cylindrical shaped projecting member to said kinematic plate;

wherein said drawing and locking means includes:

a cylindrical sleeve rotatably attached to said kinematic plate, said sleeve defining a bore dimensioned to receive said cylindrical shaped projecting member;

a race formed on one of said cylindrical sleeve and said cylindrical shaped projecting member;

a roller bearing formed on the other of said cylindrical sleeve and said cylindrical shaped projecting member, said roller bearing engageable in said race; and said race being shaped such that when said roller bearing is engaged in said race, said cylindrical shaped projecting member is drawn in and locked into said sleeve with said mating surface being secured against said kinematic plate upon rotation of said sleeve.

2. A coupler for attaching an articulated arm to a laser housing comprising:

a connector having a cylindrical shaped projecting member, said connector being attachable to an articulated arm;

a kinematic plate connectable to a laser housing;

a cylindrical sleeve rotatably attached to said kinematic plate, said sleeve defining a bore dimensioned to receive said cylindrical shaped projecting member;

a race formed on one of said cylindrical sleeve and said cylindrical shaped projecting member;

a roller bearing formed on the other of said cylindrical sleeve and said cylindrical shaped projecting member, said roller bearing engageable in said race;

said race being shaped such that when said roller bearing is engaged in said race, said cylindrical shaped projecting member is drawn in and locked into said sleeve upon rotation of said sleeve; and spring means for biasing said sleeve toward said kinematic plate.

3. The coupler of claim 2 wherein said race includes:

a vertical portion shaped to initially engage said roller bearing upon insertion of said cylindrical shaped projecting member into said sleeve; and an inclined portion shaped such that when said sleeve is rotated, said roller bearing engaged in said race causes said cylindrical shaped projecting member to be drawn toward said kinematic plate until said cylindrical shaped projecting member contacts said kinematic plate.

4. The coupler of claim 3 wherein said inclined portion terminates in a declining portion shaped to lock the rotational position of said sleeve.

5. The coupler of claim 4 wherein:

said race being formed in the outer circumference surface of said cylindrical shaped projecting member; and said roller bearing protruding from the inside surface of said sleeve into said bore.

6. The coupler of claim 5 further comprising:

a threaded hole formed through the side of said sleeve; and a threaded bearing support means engageable in said threaded hole for supporting said roller bearing inside said bore.

7. The coupler of claim 4 wherein:

said race being formed in the inside surface of said sleeve; and said roller bearing protruding from the outer circumference surface of said cylindrical shaped projecting member.

8. The coupler of claim 4 wherein said race having a shape such that rotation of said sleeve after said contact between said cylindrical shaped projecting member and said kinematic plate causes compression of said spring means.

9. The coupler of claim 4 further comprising:

a plurality of ball bearings attached to one of said cylindrical shaped projecting member and said kinematic plate; and receiving means included by the other of said cylindrical shaped projecting member and said kinematic plate for receiving said ball bearings.

10. The coupler of claim 9 wherein said spring means is a wave washer.

11. The coupler of claim 10 further comprising a sleeve ring attached to said sleeve having an annular flange, said spring means engaged with said flange to bias said flange toward said kinematic plate.

12. The coupler of claim 11 further comprising a spring clamp means attached to said kinematic plate for pressing said wave washer against said flange.

13. The coupler of claim 12 wherein said roller bearing is a ball bearing.

14. The coupler of claim 12 wherein said roller bearing is a dowel shaped cylinder.

15. A coupler for attaching an articulated arm to a laser housing comprising:

a plate fixedly connectable to a laser housing, said plate including a first kinematic coupling means;

a cylindrical member attachable at one end thereof to an articulated arm and wherein the other end of said cylindrical member includes a second kinematic coupling means having a configuration complimentary to the first kinematic coupling means of said plate; and a sleeve rotatably mounted to said plate, with said sleeve and said cylindrical member including complementary locking configurations such that rotation of said sleeve will function to draw the second kinematic coupling means of said cylindrical member into tight fitting engagement with the first kinematic coupling means of said plate whereby in use the articulated arm is aligned with the laser housing.

16. The coupler of claim 15 wherein said locking configurations include at least one race formed on one of the inner surface of the sleeve and the outer surface the cylindrical member and at least one complementary bearing receivable in said race and formed on the other of said sleeve and cylindrical member.

17. The coupler of claim 16 wherein:

said first kinematic coupling means includes one of three projecting ball bearings and three complementary indentations for receiving said ball bearings; and said second kinematic coupling means includes the other of said three projecting ball bearings and said three complementary indentations for receiving said ball bearings.

18. The coupler of claim 17 further comprising spring means for biasing said sleeve toward said plate.

19. The coupler of claim 18 wherein said race includes:

a vertical portion shaped to initially engage said complementary bearing upon insertion of said cylindrical member into said sleeve; and an inclined portion shaped such that when said sleeve is rotated, said complementary bearing engaged in said race causes said cylindrical member to be drawn toward said plate until said first and second kinematic coupling means engage.

20. The coupler of claim 19 wherein said inclined portion terminates in a declining portion shaped to lock the rotational position of said sleeve.

21. The coupler of claim 20 wherein said race having a shape such that rotation of said sleeve after said first and second kinematic coupling means engage causes compression of said spring means.

* * * * *